United States Patent [19]
Ichikawa et al.

[11] Patent Number: 5,872,185
[45] Date of Patent: Feb. 16, 1999

[54] GOLF BALL

[75] Inventors: Yasushi Ichikawa; Hisashi Yamagishi; Hiroshi Higuchi; Shunichi Kashiwagi, all of Chichibu, Japan

[73] Assignee: Bridgestone Sports Co., Ltd., Tokyo, Japan

[21] Appl. No.: 921,615

[22] Filed: Sep. 2, 1997

[30] Foreign Application Priority Data

Sep. 6, 1996 [JP] Japan .................................. 8-257780

[51] Int. Cl.$^6$ ......................... C08L 33/02; C08L 53/00; C08L 53/02; A63B 37/12
[52] U.S. Cl. ........................ 525/93; 473/373; 473/374
[58] Field of Search ............................ 525/93; 473/373, 473/374

[56] References Cited

U.S. PATENT DOCUMENTS 4,919,434 4/1990 Saito .
5,559,188 9/1996 Egashira .................................. 525/221

*Primary Examiner*—David Buttner
*Attorney, Agent, or Firm*—Sughrue, Mion, Zinn, Macpeak & Seas, PLLC

[57] ABSTRACT

In a golf ball comprising a core, an intermediate layer, and a cover, the intermediate layer is formed of a resin component consisting essentially of 10–60 parts by weight of a thermoplastic elastomer having a crystalline polyethylene block and 90–40 parts by weight of an ionomer resin having a melt index of 3–20 g/10 min. at 190° C. The resin component is easily moldable into a highly resilient intermediate layer. The ball has improved flight performance, durability and feel.

17 Claims, 1 Drawing Sheet

GOLF BALL

BACKGROUND OF THE INVENTION

1. Field of the Invention

This invention relates to a golf ball comprising a core, an intermediate layer, and a cover. More particularly, it relates to such a golf ball in which a resilient intermediate layer is formed of an easily moldable resin component consisting essentially of a mixture of a thermoplastic elastomer and an ionomer resin so that the ball may have excellent flight performance and pleasant hitting feel as well as improved durability against hitting.

2. Prior Art

Golf balls of various structures are on the market. Among others, two-piece solid golf balls having a rubber base core enclosed with a cover of ionomer resin or the like and thread-wound golf balls comprising a wound core having thread rubber wound around a solid or liquid center and a cover enclosing the core share the majority of the market.

Most amateur golfers are fond of two-piece solid golf balls which have excellent flying performance and durability although these balls have the disadvantages of a hard feel on hitting and low control due to quick separation from the club head on hitting. For this reason, many professional golfers and low handicap amateur golfers prefer wound golf balls to two-piece solid golf balls. The wound golf balls are superior in feeling and control, but inferior in flight distance and durability to the two-piece solid golf balls.

Under the present situation that two-piece solid golf balls and wound golf balls have contradictory characteristics as mentioned above, players make a choice of golf balls depending on their own skill and preference.

Various attempts have been made to solve the above-mentioned problems. One attempt is to interpose a resin layer or intermediate layer between the core and the cover to impart various properties. For example, U.S. Pat. No. 4,431,193 discloses a golf ball comprising a core, an intermediate layer formed of a hard, high flexural modulus ionomer resin, and a cover formed of a soft, low flexural modulus ionomer resin. The intermediate layer of hard resilient ionomer resin compensates for a loss of resilience inherent to the use of a soft cover. The golf ball of this patent, however, has the problems of a hard hitting feel and substantially deteriorated durability against repetitive hitting because a very hard, high or moderate acid content ionomer resin is used as the intermediate layer.

As one solution, U.S. Pat. No. 4,884,814 proposes to reduce the hardness of an ionomer resin in the intermediate layer. The golf ball of this patent, however, is low in restitution and fails to provide satisfactory flight performance.

None of the golf balls having an intermediate layer between the core and the cover have reached a fully satisfactory level. There is a need for further improvement and development.

Therefore, an object of the present invention is to provide a golf ball comprising a core, an intermediate layer and a cover in which an easily moldable, highly resilient material is used as the intermediate layer so as to improve the adhesion of the intermediate layer to both the core and the cover and improve the flight performance, hitting durability, and hitting feel of the ball.

SUMMARY OF THE INVENTION

Regarding a golf ball comprising a core, an intermediate layer and a cover, the inventors have found that when the resin component of which the intermediate layer is formed is mainly a mixture of a thermoplastic elastomer having a crystalline polyethylene block and an ionomer resin, the intermediate layer is improved in moldability and resilience and the golf ball has excellent flight performance, excellent durability, and a very soft hitting feel.

More particularly, regarding a golf ball comprising a core, an intermediate layer enclosing the core, and a cover enclosing the intermediate layer, the inventors have found that when a resin component based on a mixture of 10 to 60 parts by weight of a thermoplastic elastomer having a crystalline polyethylene block and 90 to 40 parts by weight of an ionomer resin is used, there is obtained an intermediate layer having a high degree of resilience which is not achievable with conventional blends of ionomer resins. The ball as a whole is outstandingly improved in resilience. Additionally, upon full shots with a driver, the ball receives an optimum spin rate to travel a drastically increased distance and gives a very soft pleasant hitting feel.

The inventors have further found that when an ionomer resin having a melt index of at least 3 g/10 min. at 190° C. is used as the ionomer resin to be blended with the thermoplastic elastomer in the intermediate layer, even a blend thereof with a larger proportion of a thermoplastic elastomer having a low melt index is easily moldable to form the intermediate layer without molding defects such as weld lines, sink marks and short shots. In addition, the intermediate layer is improved in adhesion to both the core and the cover and serves as a buffer for the hardness difference between the core and the cover, improving the durability of the ball against repetitive hits. The invention is predicated on this finding.

It is noted that U.S. Pat. No. 5,559,188 assigned to the same assignee as the present invention or JP-A 767/1996 discloses a golf ball comprising a core and a cover wherein the cover is formed of a resin component consisting essentially of 10 to 60 parts by weight of a thermoplastic elastomer having a crystalline polyethylene block and 90 to 40 parts by weight of an ionomer resin. The present invention uses a mixture of a thermoplastic elastomer having a crystalline polyethylene block and an ionomer resin as the intermediate layer rather than the cover and forms a cover, typically of an ionomer resin thereon, thereby providing a golf ball which is further increased in flight distance and drastically improved in durability.

According to the invention, there is provided a golf ball comprising a core, an intermediate layer enclosing the core, and a cover enclosing the intermediate layer wherein the intermediate layer comprises a resin component based on a mixture of 10 to 60 parts by weight of a thermoplastic elastomer having a crystalline polyethylene block and 90 to 40 parts by weight of an ionomer resin having a melt index of at least 3 g/10 min. at 190° C.

Preferably, the thermoplastic elastomer is a thermoplastic elastomer having a polyethylene block or a polyethylene block and a polystyrene block as a hard segment and an ethylene/butylene random copolymer as a soft segment. More preferably, the thermoplastic elastomer comprises a hydrogenated product of polybutadiene or styrene/butadiene copolymer. Preferably, the thermoplastic elastomer has a melt index of 0.01 to 15 g/10 min. at 230° C. and a surface hardness of 10 to 50 in Shore D. Further preferably, the intermediate layer has a Shore D hardness of 48 to 62.

Preferably, the ionomer resin is a mixture of an ionomer resin having a monovalent metal and an ionomer resin having a divalent metal and has a Shore D hardness of 60 to 70.

Preferably, the golf ball experiences a distortion of 2.5 to 4 mm under a constant load of 100 kg.

Preferably, the cover is mainly formed of an ionomer resin and has a Shore D hardness of 50 to 68.

BRIEF DESCRIPTION OF THE DRAWINGS

The only figure.

DESCRIPTION OF THE PREFERRED EMBODIMENTS

Figure 1:
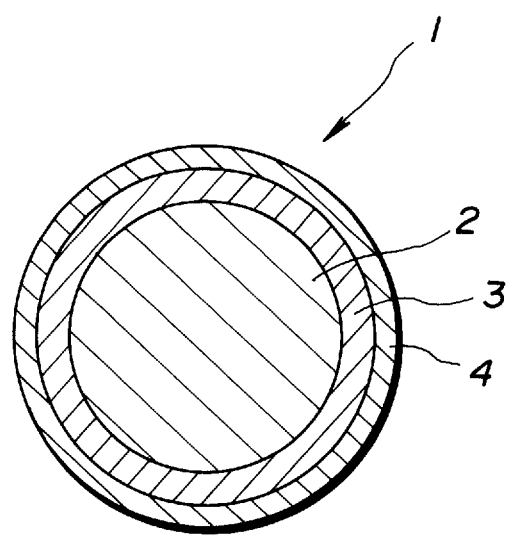
FIG. 1 is a schematic cross-sectional view of a golf ball according to one embodiment of the invention.

Referring to FIG. 1, the golf ball of the invention generally designated at 1 is illustrated as comprising a spherical core 2, an intermediate layer 3 formed on the surface of the core 2, and a cover 4 surrounding the surface of the intermediate layer 3. According to the invention, the intermediate layer 3 is formed of a resin component primarily comprising a mixture of a thermoplastic elastomer having a crystalline polyethylene block and a high melt index ionomer resin.

In the resin component of which the intermediate layer is formed, the thermoplastic elastomer having a crystalline polyethylene block used herein is a thermoplastic elastomer having a crystalline polyethylene block (E) or a crystalline polyethylene block (E) and a crystalline polystyrene block (S) as a hard segment and a relatively random copolymer (EB) structure consisting of ethylene and butylene as a soft segment. The preferred thermoplastic elastomers are block copolymers of a molecular structure having the hard segment at one end or both ends thereof, typically E-EB, E-EB-E, and E-EB-S structures.

These thermoplastic elastomers are obtained by hydrogenating polybutadiene and styrene-butadiene copolymers. The polybutadiene and styrene-butadiene copolymers to be hydrogenated are preferably butadiene polymers having 1,4-polymerized blocks with a 1,4-bond content of 95 to 100% by weight and containing 50 to 100% by weight, especially 80 to 100% by weight of 1,4-bond based on the entire weight of butadiene structure. In particular, thermoplastic elastomers of the E-EB-E type are obtained by hydrogenating polybutadiene wherein both ends of its molecular chain are 1,4-polymers rich in 1,4-bond and an intermediate portion is a mixture of 1,4-bond and 1,2-bond. The percent hydrogenation of hydrogenated products of polybutadiene and styrene-butadiene copolymers (that is, percent conversion of double bonds in polybutadiene and styrene-butadiene copolymers into saturated bonds) is preferably 60 to 100%, more preferably 90 to 100%. With a percent hydrogenation of less than 60%, gelation and deterioration would occur in blending a hydrogenated polybutadiene with an ionomer resin and problems would arise with respect to the hitting durability of the resulting intermediate layer.

Preferably the thermoplastic elastomers contain about 10 to 50% by weight of the hard segment. Elastomers containing more than 50% by weight of the hard segment would be less flexible, failing to achieve the objects of the invention. With less than 10% by weight of the hard segment, a blend would be less moldable.

The thermoplastic elastomer should preferably have a melt index of 0.01 to 15 g/10 min. at 230° C., more preferably 0.03 to 10 g/10 min. at 230° C. from the standpoint of preventing defects such as weld lines, sink marks and short shots upon injection molding.

Further preferably, the thermoplastic elastomer has a surface hardness of 10 to 50 in Shore D. A thermoplastic elastomer having a surface Shore D hardness of less than 10, which indicates a less content of terminal crystalline polyethylene, would be less compatible with an ionomer resin so that the resulting ball might lose durability against repetitive hits. A thermoplastic elastomer having a surface Shore D hardness of more than 50 would be less resilient and a blend thereof with an ionomer resin would also be less resilient.

The thermoplastic elastomers preferably have a number average molecular weight of about 30,000 to 800,000.

The thermoplastic elastomers having a crystalline polyethylene block are commercially available, for example, under the trade name of DYNARON E6100P, HSB604, and E4600P from Nihon Synthetic Rubber K.K. They may be used alone or in admixture of two or more. Especially DYNARON E6100P which is a block polymer having a crystalline ethylene block at each end is useful in the practice of the invention.

The ionomer resin to be blended with the thermoplastic elastomer should have a melt index of at least 3 g/10 min. at 190° C., preferably 3 to 20 g/10 min. at 190° C., more preferably 4 to 15 g/10 min. at 190° C. If the melt index of the ionomer resin is less than 3 g/10 min. at 190° C., a corresponding resin blend would be too low in melt flow so that the mold cavity might not be fully filled with the resin blend, resulting in the intermediate layer with molding defects such as weld lines, sink marks and short shots.

When an ionomer resin having such a high melt index is used, even a blend thereof with a larger proportion of a thermoplastic elastomer having a low melt index, especially DYNARON E6100P (melt index 0.6 g/10 min. at 230° C.) is easily moldable to form the intermediate layer without molding defects such as weld lines, sink marks and short shots. In addition, the intermediate layer is improved in adhesion to both the core and the cover, eventually improving the durability of the ball against repetitive hits.

It is noted that the melt index (M.I.) is indicative of the melt flow of a thermoplastic resin as measured according to JIS K 7210. The melt index of an ionomer resin is expressed by the amount (in gram) of the resin extruded for 10 minutes at 190° C. under a load of 2,160 grams. The melt index of an thermoplastic elastomer is expressed by the amount (in gram) of the elastomer extruded for 10 minutes at 230° C. under a load of 2,160 grams.

The ionomer resins are preferably copolymers of α-olefin and α,β-unsaturated carboxylic acid wherein the carboxyl group is neutralized with a metal ion (e.g., Na, Li, Zn, Mg, and K ions). Examples of the α-olefin include those having a few carbon atoms such as ethylene and propylene. Examples of the α,β-unsaturated carboxylic acid include acrylic acid, methacrylic acid, maleic acid and fumaric acid, with acrylic acid and methacrylic acid being preferred. The binary copolymers of α-olefin and α, β-unsaturated carboxylic acid desirably contain 5 to 20% by weight of the α,β-unsaturated carboxylic acid. Preferably the degree of neutralization with metal ions is 10 to 90 mol % of the acid group.

Preferably a mixture of a first ionomer resin having a monovalent metal and a second ionomer resin having a divalent metal is used as the ionomer resin from the standpoint of improving resilience. In the mixture, the weight ratio of the first to the second ionomer resin is preferably between 20/80 and 80/20. Typically the monovalent metal is sodium (Na) and the divalent metal is zinc (Zn).

The ionomer resin used herein is not critical insofar as its melt index (at 190° C.) is within the above-defined range. Commercially available ionomer resins, for example, Surlyn AD8511 and AD8512 from E. I. duPont de Nemours & Co. may be used alone or in admixture of two or more. Where a blend of two or more ionomer resins is used, the blend should have a melt index (at 190° C.) within the above-defined range. From the standpoint of improving resilience, the ionomer resin or ionomer resin blend should preferably have a Shore D hardness of 60 to 70, especially 62 to 67.

In the practice of the invention, the thermoplastic elastomer having a crystalline polyethylene block and the ionomer resin should be blended such that the blend contains 10 to 60 parts by weight, preferably 16 to 50 parts by weight of the thermoplastic elastomer and 90 to 40 parts by weight, preferably 84 to 50 parts by weight of the ionomer resin provided that the total of the two components is 100 parts by weight. Blending less than 10 parts by weight of the thermoplastic elastomer is insufficient for softening purposes so that hitting feel and durability are not fully improved. More than 60 parts by weight of the thermoplastic elastomer detracts from resilience.

Although the intermediate layer is mainly composed of a mixture of the thermoplastic elastomer and the ionomer resin according to the invention, various additives such as pigments, dispersants, and antioxidants may be added to the resin component if necessary.

The intermediate layer preferably has a Shore D hardness of 48 to 62, more preferably 50 to 58. An intermediate layer with a Shore D hardness of less than 48 would be less resilient whereas an intermediate layer with a Shore D hardness of more than 62 would fail to improve hitting feel and controllability and maintain durability.

The thickness and specific gravity of the intermediate layer may be properly adjusted insofar as the object of the invention is attainable. Preferably the thickness is 1 to 3 mm, especially 1.2 to 2.5 mm, and the specific gravity is 0.9 to 1.3, especially 0.95 to 1.2.

The core 2 to be enclosed with the intermediate layer 3 is not critical and may be either a solid core or a wound core although the solid core is preferred. The wound core may have either a solid center or a liquid center. The wound core or solid core may be produced from a well-known material by a conventional technique.

No particular limits are imposed on the hardness, diameter, weight and specific gravity of the core insofar as the object of the invention is attainable. For example, the solid core may have a hardness corresponding to a distortion of 2.8 to 4.5 mm, especially 3 to 4.5 mm under a constant load of 100 kg, a diameter of 34.3 to 38.7 mm, especially 34.7 to 37.9 mm, and a weight of 28.5 to 35 grams, especially 29.5 to 33 grams.

Any desired method may be employed in enclosing the core with the intermediate layer. For example, the resin component is directly injection molded around the core. Alternatively, a pair of hemispherical half cups are formed from the resin component, and the core is encased in the half cups, which are heat compression molded at 110 to 160° C. for 2 to 10 minutes. Particularly when the intermediate layer is formed around the core by injection molding, the molding of the intermediate layer is effectively accomplished without leaving molding defects such as weld lines, sink marks and short shots for the reason that the resin component of the intermediate layer contains a high melt index ionomer resin.

The cover 4 is preferably composed mainly of an ionomer resin, for example, Surlyn 8120 (E. I. duPont) and Himilan 1605, 1855, 1557, 1601 and 1706 (Mitsui duPont Polychemical K.K.). Another thermoplastic resin may be blended with the ionomer resin in such an amount that the physical properties of a golf ball may not be impaired, for example, less than 10% by weight, especially less than 5% by weight of the entire cover stock. Further, if necessary, various additives such as pigments, dispersants, antioxidants and UV absorbers may be added to the cover stock in conventional amounts.

The cover stock should preferably have a surface hardness of 50 to 68, more preferably 50 to 63, most preferably 54 to 60 on Shore D hardness scale. A cover with a Shore D hardness of less than 50 would be less resilient and adversely affect the flight distance whereas a cover with a Shore D hardness of more than 68 would fail to improve hitting feel and controllability and maintain durability. The cover preferably has a (radial) thickness of 1 to 3 mm, more preferably 1.2 to 2.5 mm. The total thickness of the intermediate layer and the cover is preferably at least 2 mm, more preferably 2 to 4.2 mm. A total thickness of less than 2 mm would lead to a loss of durability against hitting.

By forming a cover from a cover stock containing at least 90% by weight, preferably at least 95% by weight, especially at least 97% by weight of the ionomer resin to a Shore D hardness of 50 to 68 and combining this cover with the above-mentioned intermediate layer, there is obtained a golf ball which will travel an increased distance and is outstandingly durable against hitting.

Any desired method may be used in forming the cover on the intermediate layer. For example, the cover stock is directly injection molded around the intermediate layer. Alternatively, the cover stock is molded into a pair of hemispherical half-cups, and the core with the intermediate layer is encased in the half-cups, which are heat compression molded at 110 to 160° C. for 2 to 10 minutes.

The golf ball may be indented in its cover surface with dimples in a conventional manner. At the end of molding, the ball is subject to surface finishing treatments such as buffing, painting and stamping.

The golf ball according to the invention is of the above-mentioned construction. The golf ball preferably has a hardness corresponding to a distortion of 2.5 to 4 mm, especially 2.8 to 3.5 mm under a constant load of 100 kg. Other ball parameters including weight and diameter may be properly determined in accordance with the Rules of Golf.

There has been described a golf ball having an intermediate layer composed mainly of a blend of a thermoplastic elastomer having a crystalline polyethylene block and a high melt index ionomer resin in a specific ratio. The intermediate layer is easily moldable and has high resilience or restitution. The ball had the advantages of improved flight performance, improved durability against hitting, and pleasant hitting feel.

EXAMPLE

Examples of the present invention are given below by way of illustration and not by way of limitation. All the amounts of components used in the solid core, intermediate layer, and cover are expressed in parts by weight.

Examples 1–9 and Comparative Examples 1–7

For the manufacture of three-piece solid golf balls, solid cores A, B, and C as shown in Table 1 were prepared by milling a rubber composition of the formulation shown in Table 1 and molding and vulcanizing it in a mold at 160° C. for 20 minutes. The cores were measured for hardness as a distortion (mm) under a constant load of 100 kg. The results are shown in Tables 2 and 3.

TABLE 1

|  | A | B | C |
|---|---|---|---|
| Cis-1,4-polybutadiene[*1] | 100 | 100 | 100 |
| Zinc diacrylate | 27 | 26 | 28 |
| Zinc oxide | 28 | 22 | 21.5 |
| Antioxidant | 0.1 | 0.1 | 0.1 |
| Dicumyl peroxide | 1 | 1 | 1 |
| Zn salt of pentachlorothiophenol | 1 | 1 | 1 |

[*1]JSR BR01 by Nihon Synthetic Rubber K.K.

Next, an intermediate layer-forming composition and a cover composition were prepared by milling components of the formulation shown in Tables 2 and 3 and injection molded around the solid core and the intermediate layer, respectively, obtaining golf balls of Examples 1 to 9 and Comparative Examples 1 to 7 are reported in Tables 2 and 3. It is noted that Comparative Examples 1 and 2 were two-piece solid golf balls free of the intermediate layer.

The golf balls were examined for moldability of the intermediate layer, initial velocity, ball hardness, flight performance, hitting feel, and durability against hitting by the following tests. The results are shown in Tables 2 and 3.

Moldability of the intermediate layer

After the intermediate layer-forming composition was injected molded on the surface of the core, the intermediate layer was observed for molding defects.

O: neither weld lines nor sink marks occurred

X: weld lines and sink marks occurred

Initial velocity

An initial velocity (m/s) was measured according to the measurement method of USGA (or R&A).

Ball hardness

Hardness is expressed by a distortion (mm) of a ball under a constant load of 100 kg.

Flight performance

Using a hitting machine by True Temper Co. equipped with a driver (#W1), a ball was actually struck at a head speed of 45 m/sec. (HS45) to measure a spin rate, carry and total distance. The club used was PRO 230TITAN driver by Bridgestone Sports Co., Ltd. with loft angle 11°, shaft Harmotech-lite, HM50J (HK), hardness S, and balance D2.

Hitting feel

An actual hitting test was performed on a ball by a panel of five professional golfers with a head speed of 45 m/sec. (HS45). The ball was rated by the following criterion.

O: soft

X: hard

Durability against hitting

A ball was successively hit 300 times at a head speed of 38 m/sec. before it was observed for surface cracks.

TABLE 2

|  | Example | | | | | | | | |
|---|---|---|---|---|---|---|---|---|---|
|  | 1 | 2 | 3 | 4 | 5 | 6 | 7 | 8 | 9 |
| Core | | | | | | | | | |
| Core type | A | A | A | A | A | A | A | A | A |
| Hardness (mm) | 3.8 | 3.8 | 3.8 | 3.8 | 3.8 | 3.8 | 3.8 | 3.8 | 3.8 |
| Intermediate layer | | | | | | | | | |
| AD8511[*2] | 25 | 35 | 42 | 35 | 25 | 35 | 42 | 42 | 35 |
| AD8512[*2] | 25 | 35 | 42 | 35 | 25 | 35 | 42 | 42 | 35 |
| D6100P[*3] | 50 | 30 | 16 | 30 | — | — | — | 16 | 30 |
| D4600P[*3] | — | — | — | — | 50 | 30 | 16 | — | — |
| Resin hardness (Shore D) | 50 | 56 | 58 | 56 | 50 | 53 | 56 | 58 | 56 |
| Gage (mm) | 1.6 | 1.6 | 1.6 | 1.6 | 1.6 | 1.6 | 1.6 | 1.6 | 1.6 |
| Moldability | O | O | O | O | O | O | O | O | O |
| Cover | | | | | | | | | |
| H1605[*4] | — | — | — | 25 | — | — | — | — | 50 |
| S8120[*2] | — | — | — | — | — | — | — | 50 | — |
| H1855[*4] | — | — | — | — | — | — | — | 30 | — |
| H1557[*4] | 50 | 50 | 50 | 50 | 50 | 50 | 50 | 20 | — |
| H1601[*4] | 50 | 50 | 50 | 25 | 50 | 50 | 50 | — | — |
| H1706[*4] | — | — | — | — | — | — | — | — | 50 |
| Resin hardness (Shore D) | 59 | 59 | 59 | 60 | 59 | 59 | 59 | 54 | 63 |
| Gage (mm) | 1.5 | 1.5 | 1.5 | 1.5 | 1.5 | 1.5 | 1.5 | 1.5 | 1.5 |
| Ball | | | | | | | | | |
| Outer diameter (mm) | 42.7 | 42.7 | 42.7 | 42.7 | 42.7 | 42.7 | 42.7 | 42.7 | 42.7 |
| Weight (g) | 45.3 | 45.3 | 45.3 | 45.3 | 45.3 | 45.3 | 45.3 | 45.3 | 45.3 |
| Hardness (mm) | 3.3 | 3.0 | 2.8 | 2.9 | 3.3 | 3.2 | 3.0 | 3.0 | 2.8 |
| Initial velocity (m/s) | 76.9 | 77.1 | 77.2 | 77.3 | 77.0 | 77.1 | 77.2 | 76.8 | 77.4 |
| Test | | | | | | | | | |
| #W1/HS45 | | | | | | | | | |
| Spin (rpm) | 2510 | 2560 | 2610 | 2510 | 2500 | 2550 | 2610 | 2800 | 2400 |
| Carry (m) | 217.5 | 218.0 | 218.5 | 218.0 | 218.0 | 218.5 | 218.5 | 218.0 | 218.5 |
| Total (m) | 226.5 | 226.5 | 227.0 | 227.0 | 227.0 | 227.0 | 227.0 | 226.0 | 227.5 |
| Hitting feel | O | O | O | O | O | O | O | O | O |
| Durability against 300 hits | no cracks | no cracks | no cracks | no cracks | no cracks | no cracks | no cracks | no cracks | no cracks |

TABLE 3

|  | Comparative Example | | | | | | |
|---|---|---|---|---|---|---|---|
|  | 1 | 2 | 3 | 4 | 5 | 6 | 7 |
| Core | | | | | | | |
| Core type | B | C | A | A | A | A | A |
| Hardness (mm) | 4.0 | 3.8 | 3.8 | 3.8 | 3.8 | 3.8 | 3.8 |
| Intermediate layer | | | | | | | |
| AD8511*2 | — | — | 25 | 35 | 42 | 50 | — |
| AD8512*2 | — | — | 25 | 35 | 42 | 50 | — |
| D6100P*3 | — | — | — | — | — | — | 50 |
| S8320*2 | — | — | 25 | 15 | 8 | — | — |
| S9320*2 | — | — | 25 | 15 | 8 | — | — |
| H1706*4 | — | — | — | — | — | — | 25 |
| H1605*4 | — | — | — | — | — | — | 25 |
| Resin hardness (Shore D) | — | — | 50 | 56 | 58 | 63 | 50 |
| Gage (mm) | — | — | 1.6 | 1.6 | 1.6 | 1.6 | 1.6 |
| Moldability | — | — | ○ | ○ | ○ | ○ | X |
| Cover | | | | | | | |
| H1706*4 | — | 35 | — | — | — | — | — |
| H1605*4 | — | 35 | — | — | — | — | — |
| D6100P*3 | — | 30 | — | — | — | — | — |
| S8120*2 | — | — | — | — | — | 50 | — |
| H1855*4 | — | — | — | — | — | 30 | — |
| H1557*4 | 50 | — | 50 | 50 | 50 | 20 | 50 |
| H1601*4 | 50 | — | 50 | 50 | 50 | — | 50 |
| Resin hardness (Shore D) | 59 | 56 | 59 | 59 | 59 | 54 | 59 |
| Gage (mm) | 2.0 | 2.0 | 1.5 | 1.5 | 1.5 | 1.5 | 1.5 |
| Ball | | | | | | | |
| Outer diameter (mm) | 42.7 | 42.7 | 42.7 | 42.7 | 42.7 | 42.7 | 42.7 |
| Weight (g) | 45.3 | 45.3 | 45.3 | 45.3 | 45.3 | 45.3 | 45.3 |
| Hardness (mm) | 3.1 | 3.0 | 3.3 | 3.0 | 2.8 | 2.5 | 3.3 |
| Initial velocity (m/s) | 76.9 | 76.9 | 76.3 | 76.6 | 76.8 | 77.2 | 76.9 |
| Test | | | | | | | |
| #W1/HS45 | | | | | | | |
| Spin (rpm) | 2510 | 2700 | 2510 | 2560 | 2610 | 2700 | 2520 |
| Carry (m) | 217.0 | 217.0 | 216.0 | 216.5 | 217.0 | 218.5 | 217.0 |
| Total (m) | 225.0 | 225.0 | 223.0 | 223.5 | 224.0 | 227.0 | 227.0 |
| Hitting feel | ○ | ○ | ○ | ○ | ○ | X | ○ |
| Durability against 300 hits | cracked | cracked | no cracks | no cracks | no cracks | cracked | no cracks |

*2 ionomer resins by E. I. duPont de Nemours & Co.
AD8511: Zn salt, Shore D hardness 61, M.I. 5.3 g/10 min. (190° C.)
AD8512: Na salt, Shore D hardness 63, M.I. 4.8 g/10 min. (190° C.)
S8120: Na salt, Shore D hardness 45, M.I. 1.0 g/10 min. (190° C.)
S8320: Na salt, Shore D hardness 37, M.I. 1.1 g/10 min. (190° C.)
S9320: Zn salt, Shore D hardness 36, M.I. 1.0 g/10 min. (190° C.)
*3 thermoplastic elastomer having crystalline polyethylene block by Nihon Synthetic Rubber K.K.
DYNARON E6100P: hydrogenated polybutadiene, M.I. 0.6 g/10 min. (230° C.), styrene content 0%, E-EB-E type
DYNARON E4600P: hydrogenated butadiene-styrene copolymer, M.I. 5.6 g/10 min. (230° C.), styrene content 20%, E-EB-E type
*4 ionomer resins by Mitsui dupont Polychemical K.K.
H1706: Zn salt, Shore D hardness 62, M.I. 0.9 g/10 min. (190° C.)
H1605: Na salt, Shore D hardness 63, M.I. 2.8 g/10 min. (190° C.)
H1855: Zn salt, Shore D hardness 56, M.I. 1.0 g/10 min. (190° C.)
H1557: Zn salt, Shore D hardness 60, M.I. 5.0 g/10 min. (190° C.)
H1601: Na salt, Shore D hardness 62, M.I. 1.2 g/10 min. (190° C.)

It is evident from Tables 2 and 3 that the two-piece golf balls of Comparative Examples 1 and 2 are less durable against hitting. Of the golf balls of Comparative Examples 3 to 6 having an intermediate layer composed of a blend of ionomer resins, Comparative Examples 3 to 5 travel a short distance and Comparative Example 6 is poor in feel and durability. In Comparative Example 7, the intermediate layer shows molding defects because the blend contains an ionomer resin having a low melt index.

In contrast, the golf balls of Examples 1 to 9 are improved in all of the moldability of the intermediate layer, flight performance, hitting feel and durability against hitting.

Although some preferred embodiments have been described, many modifications and variations may be made thereto in the light of the above teachings. It is therefore to be understood that within the scope of the appended claims, the invention may be practiced otherwise than as specifically described.

We claim:

1. A golf ball comprising a core, an intermediate layer enclosing the core, and a cover enclosing the intermediate layer, said intermediate layer comprising a resin component based on a mixture of 10 to 60 parts by weight of a thermoplastic elastomer having a crystalline polyethylene block and 90 to 40 parts by weight of an ionomer resin having a melt index of at least 3 g/10 min. at 190° C.

2. The golf ball of claim 1 wherein said thermoplastic elastomer having a crystalline polyethylene block is a thermoplastic elastomer having a polyethylene block or a polyethylene block and a polystyrene block as a hard segment and an ethylene/butylene random copolymer as a soft segment.

3. The golf ball of claim 1 wherein said thermoplastic elastomer comprises a hydrogenated product of polybutadiene or styrene/butadiene copolymer.

4. The golf ball of claim 1 wherein said thermoplastic elastomer has a melt index of 0.01 to 15 g/10 min. at 230° C. and a surface hardness of 10 to 50 in Shore D.

5. The golf ball of claim 1 wherein said ionomer resin is a mixture of an ionomer resin having a monovalent metal and an ionomer resin having a divalent metal and has a Shore D hardness of 60 to 70.

6. The golf ball of claim 1 wherein said intermediate layer has a Shore D hardness of 48 to 62.

7. The golf ball of claim 1 which has a distortion of 2.5 to 4 mm under a constant load of 100 kg.

8. The golf ball of claim 1 wherein said cover is mainly formed of an ionomer resin and has a Shore D hardness of 50 to 68.

9. The golf ball of claim 1, wherein said thermoplastic elastomer has a melt index of 0.03 to 10 g/10 min. at 230° C.

10. The golf ball of claim 1, wherein said intermediate layer has a Shore D hardness of 50 to 58.

11. The golf ball of claim 1, wherein said intermediate layer has a thickness in the range of 1.2 to 2.5 mm and a specific gravity in the range of 0.9 to 1.3.

12. The golf ball of claim 1, wherein said core is a solid core having a distortion in the range of 2.8 to 4.5 mm under a constant load of 100 kg.

13. The golf ball of claim 1, wherein said core is a solid core having a diameter in the range of 34.3 to 38.7 mm and a weight in the range of 28.5 to 35 grams.

14. The golf ball of claim 1, wherein said cover has a surface hardness in the range of 54 to 60 on Shore D.

15. The golf ball of claim 1, wherein said cover has a thickness in the range of 1 to 3 mm.

16. The golf ball of claim 1, wherein a total thickness of said intermediate layer and said cover is in the range of 2.0 to 4.2 mm.

17. The golf ball of claim 1, wherein said golf ball has a distortion of 2.8 to 3.5 mm under a constant load of 100 kg.

* * * * *